(12) United States Patent
Wang et al.

(10) Patent No.: US 10,795,163 B2
(45) Date of Patent: Oct. 6, 2020

(54) DISPLAY DEVICE AND WEARABLE EQUIPMENT

(71) Applicants: Beijing BOE Optoelectronics Technology Co., Ltd., Beijing (CN); BOE Technology Group Co., Ltd., Beijing (CN)

(72) Inventors: Chenru Wang, Beijing (CN); Ruijun Dong, Beijing (CN); Yali Liu, Beijing (CN); Xuebing Zhang, Beijing (CN); Lili Chen, Beijing (CN); Hao Zhang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/335,836

(22) PCT Filed: Sep. 26, 2018

(86) PCT No.: PCT/CN2018/107652
§ 371 (c)(1),
(2) Date: Mar. 22, 2019

(87) PCT Pub. No.: WO2019/144637
PCT Pub. Date: Aug. 1, 2019

(65) Prior Publication Data
US 2020/0159019 A1 May 21, 2020

(30) Foreign Application Priority Data

Jan. 25, 2018 (CN) .......................... 2018 1 0073259

(51) Int. Cl.
*G02F 1/29* (2006.01)
*G02B 27/01* (2006.01)
(Continued)

(52) U.S. Cl.
CPC ..... *G02B 27/0172* (2013.01); *G02B 27/0081* (2013.01); *G02B 27/0176* (2013.01);
(Continued)

(58) Field of Classification Search
CPC ....................................................... G02F 1/29
See application file for complete search history.

(56) References Cited

U.S. PATENT DOCUMENTS 9,939,648 B2  4/2018  Lee et al.
10,139,628 B2  11/2018  Pan et al.
(Continued)

FOREIGN PATENT DOCUMENTS

CN  102540465 A  7/2012
CN  106940478 A  7/2017
(Continued)

OTHER PUBLICATIONS

The Chinese First Office Action and Search Report for Chinese Patent Application No. 201810073259.7, dated May 15, 2019, 13 pages.
(Continued)

*Primary Examiner* — Edmond C Lau
(74) *Attorney, Agent, or Firm* — Westman, Champlin & Koehler, P.A.

(57) ABSTRACT

A display device includes a transparent display screen, and a first lens group that converges light. The transparent display screen intersects a main optical axis of the first lens group, a distance between the transparent display screen and the first lens group along the main optical axis of the first lens group is less than a focal length of the first lens group,
(Continued)

such that, both a display image on the transparent display screen and an environmental image through the transparent display screen and the first lens group or through the first lens group can be observed at an observation position that is located on the main optical axis of the first lens group. Both the observation position and the first lens group are located at a same side of the transparent display screen, and the observation position is farther from the transparent display screen than the first lens group.

12 Claims, 3 Drawing Sheets

(51) Int. Cl.
    *G02B 27/00*     (2006.01)
    *G02F 1/1335*     (2006.01)

(52) U.S. Cl.
    CPC .......... *G02F 1/133526* (2013.01); *G02F 1/29* (2013.01); *G02B 2027/0123* (2013.01); *G02F 2001/294* (2013.01)

(56) References Cited

U.S. PATENT DOCUMENTS

2014/0153102 A1* 6/2014 Chang ................ G02B 27/0172
    359/630
2014/0266990 A1* 9/2014 Makino .............. G02B 27/0172
    345/8
2015/0145751 A1* 5/2015 Momonoi ............ G02B 3/0006
    345/8
2016/0011422 A1 1/2016 Thurber et al.
2017/0219827 A1* 8/2017 Pan ................... G02F 1/133528

FOREIGN PATENT DOCUMENTS

| CN | 106997099 A | 8/2017 |
| CN | 107015362 A | 8/2017 |
| CN | 206649217 U | 11/2017 |
| CN | 107430281 A | 12/2017 |
| CN | 108169912 A | 6/2018 |
| EP | 1347641 A1 | 9/2003 |

OTHER PUBLICATIONS

The International Search Report, for International Application No. PCT/CN2018/107652 dated Jan. 4, 2019, 2 pages.
The Written Opinion, including English translation of Box V, for International Application No. PCT/CN2018/107652 dated Jan. 4, 2019, 13 pages.

* cited by examiner

DISPLAY DEVICE AND WEARABLE EQUIPMENT

CROSS-REFERENCE TO RELATED APPLICATION

This application is a 371 National Stage application of International Application No. PCT/CN2018/107652, filed on Sep. 26, 2018, which has not yet published, and which claims priority to Chinese Patent Application No. 201810073259.7 filed on Jan. 25, 2018 in the State Intellectual Property Office of China, the disclosures of which are hereby incorporated by reference in their entireties.

TECHNICAL FIELD

The present disclosure relate to the field of display technology, and particularly, to a display device and a wearable equipment.

BACKGROUND

Augmented Reality (AR for short) technology integrates virtual information (such as objects, pictures, videos, etc.) into the real environment. The virtual information and real environmental information complement each other and are superimposed on each other, to enrich the real world. That is, the virtual information is applied to the real environment, and the real environmental information and the virtual information are superimposed in real time on the same picture or space. With the developments of software and hardware of the display technology, the AR display technology is increasingly coming to the consumer's field of vision, and will have extraordinary contributions in industry, military, education, medical treatment, Internet of things and other industries.

At present, an optical system in the AR display technology proposed in the art mainly adopts an off-axis system, and a liquid crystal display (LCD), a liquid crystal on silicon (LCOS) display, and an organic light emitting diode (OLED) display can be used as image sources that provide virtual information. The image source is placed above or to the side of human eye (that is, is not coaxial with the visual axis of the eye), and the light of image emitted by the image source is refracted and deflected by the optical system to change its direction and then reaches the human eye, resulting in that the human eye sees a magnified image (as the virtual information) in a distant view. At the same time, the light from real environment (as the real environmental information) is observed by the human eye through a transparent optical system. Such off-axis systems mostly adopt free-form surface reflection system or diffraction waveguide system, which are difficult to design and manufacture, and which are costly. In addition, vertical dimension of an AR display device is increased. If a large angle of view is to be achieved, this structure is often subject to a sharp increase in volume and process limitations. Thus, the above shortcomings have become a bottleneck restricting the widespread use of the AR display technology.

SUMMARY

According to an aspect of the present disclosure, there is provided a display device, comprising: a transparent display screen, and a first lens group that converges light;
wherein, the transparent display screen intersects a main optical axis of the first lens group, a distance between the transparent display screen and the first lens group along the main optical axis of the first lens group is less than a focal length of the first lens group, such that, both a display image on the transparent display screen and an environmental image through the transparent display screen and the first lens group or through the first lens group can be observed at an observation position that is located on the main optical axis of the first lens group; wherein both the observation position and the first lens group are located at a same side of the transparent display screen, and the observation position is farther from the transparent display screen than the first lens group.

In some embodiments, the display device may further comprise: a second lens group that diffuses light; wherein the second lens group and the first lens group are located on both sides of the transparent display screen, respectively; and the main optical axis of the first lens group coincides with a main optical axis of the second lens group.

In some embodiments, a focal point, closing to the transparent display screen, of the first lens group and a focal point, away from the transparent display screen, of the second lens group are at a same position.

In some embodiments, each of the first lens group and the second lens group may comprise one or more lenses.

In some embodiments, the one or more lenses may comprise a glass lens, a liquid crystal lens or a liquid lens.

In some embodiments, the liquid crystal lens has an adjustable focal power.

In some embodiments, a plane in which the transparent display screen is located may be perpendicular to the main optical axis of the first lens group.

In some embodiments, a geometric center of the transparent display screen may be on the main optical axis of the first lens group.

In some embodiments, the transparent display screen may be a flexible transparent display screen.

In some embodiments, the display device may further comprise: a supporter configured to support the first lens group, the second lens group and the transparent display screen.

In some embodiments, the supporter may be a transparent supporter.

According to another aspect of the present disclosure, there is provided a wearable equipment comprising the display device of any one of the abovementioned embodiments.

In some embodiments, the wearable equipment may be an augmented reality headwear equipment.

BRIEF DESCRIPTION OF THE DRAWINGS

The above and/or additional aspects and advantages of the present disclosure will become apparent and readily understood from the following description on the embodiments in conjunction with the accompanying drawings, in which.

DETAILED DESCRIPTION OF THE EMBODIMENTS

It has been found by the inventor(s) of the present disclosure that at present, an optical system proposed in a related art AR display technology mainly employs an off-axis optical system, and such off-axis optical system mostly employs a free-form surface surface prism or a diffraction optical waveguide.

Figure 1:
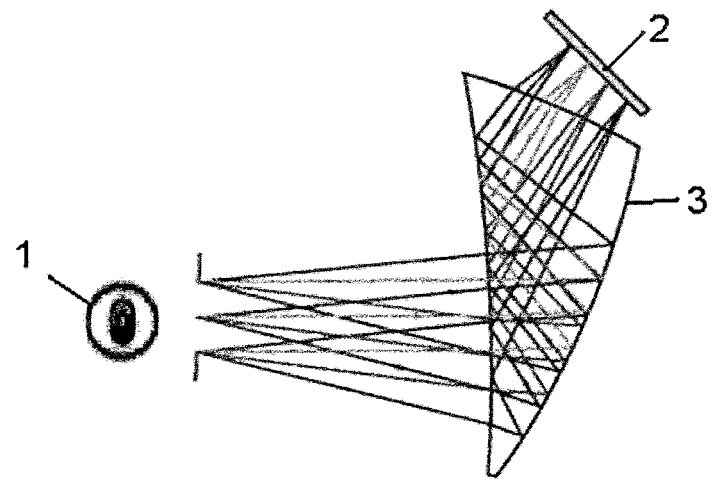
FIG. 1 is a schematic view showing a structure of a related art AR system with a catadioptric free-form surface prism.

Specifically, FIG. 1 is a schematic view showing a structure of a related art AR system with a catadioptric free-form surface prism. In FIG. 1, an image source 2 is placed above the human eye 1 and is not coaxial with the visual axis of the human eye 1. The light emitted from the image source 2 is refracted and reflected by a catadioptric free-form surface prism 3 to change its direction, and then reaches the human eye, resulting in that the human eye sees a magnified image (as the virtual information) in a distant view. Meanwhile, the real ambient light (as the real environmental information) is observed by the human eye 1 through a transparent optical system.

Figure 2:
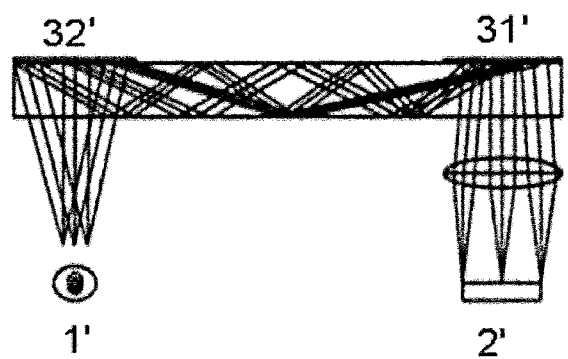
FIG. 2 is a schematic view showing a structure of a related art AR system with a catadioptric diffraction optical waveguide.

FIG. 2 is a schematic view showing a structure of a prior art AR system with a catadioptric diffraction optical waveguide. In FIG. 2, a virtual image source 2' is placed on the side of the human eye 1' and is not coaxial with the visual axis of the human eye. The light emitted from the virtual image source is diffracted and converged by a first diffractive optical element 31' and a second diffractive optical element 32' to change its direction, and then reaches the human eye, resulting in that the human eye sees a magnified image (as the virtual information) in a distant view. Meanwhile, the real ambient light (as the real environmental information) is observed by the human eye 1' through a transparent optical system. Diffractive Optical Elements (BOE for short), also known as binary optics, are mainly used for laser beam shaping, such as homogenization, collimation, focusing, to form specific patterns, and the like.

It has also been found by the inventor(s) of the present disclosure that, the AR system designed based on the off-axis system encounters great difficulty in both design and production, and the cost is also high. Moreover, in order to achieve a large angle of view, the AR system designed based on the off-axis system tends to increase vertical dimension of an AR display device as the angle of view is adjusted, and is often limited in the aspects of volume and process.

In order to solve or alleviate at least one of the above-mentioned defects existing in the related art, embodiments of the present disclosure provide a display device, and the display device comprises: a transparent display screen, and a first lens group that converges light; wherein, the transparent display screen intersects a main optical axis of the first lens group, a distance between the transparent display screen and the first lens group along the main optical axis of the first lens group is less than a focal length of the first lens group, such that, both a display image on the transparent display screen and an environmental image through the transparent display screen and the first lens group or through the first lens group can be observed at an observation position that is located on the main optical axis of the first lens group; wherein both the observation position and the first lens group are located at a same side of the transparent display screen, and the observation position is farther from the transparent display screen than the first lens group.

Herein, the term "display image" may refer to an image displayed by the transparent display screen serving as an image source. According to embodiments of the present disclosure, the human eye located at an observation position of the display device can see a picture, which is magnified by the first lens group, from the image displayed by the transparent display screen, to achieve an enlarged angle of view. The term "environmental image" may refer to an image generated by entering, through the transparent display screen and the first lens group or through the first lens group, a real environment where the display device is located into the human eye located at the observation position of the display device.

In an exemplary embodiment, the plane where the transparent display screen is located is substantially perpendicular to the main optical axis of the first lens group, and more specifically, the geometric center of the transparent display screen may be located substantially on the main optical axis of the first lens group. For example, in the case that the transparent display screen is rectangular, the geometric center of the rectangular transparent display screen is an intersection of two diagonal lines.

In some embodiments, the first lens group comprises one or more lenses, and the lenses comprise a glass lens, a liquid crystal lens or a liquid lens. Moreover, the liquid crystal lens has an adjustable focal power.

The embodiments of the present disclosure are described in detail below, and examples of the embodiments are illustrated in the drawings, wherein throughout the same or similar reference numerals refer to the same or similar elements or elements having the same or similar functions. The embodiments described below with reference to the accompanying drawings are intended to be illustrative only, and are not to be construed as limiting the present disclosure.

Figure 3:
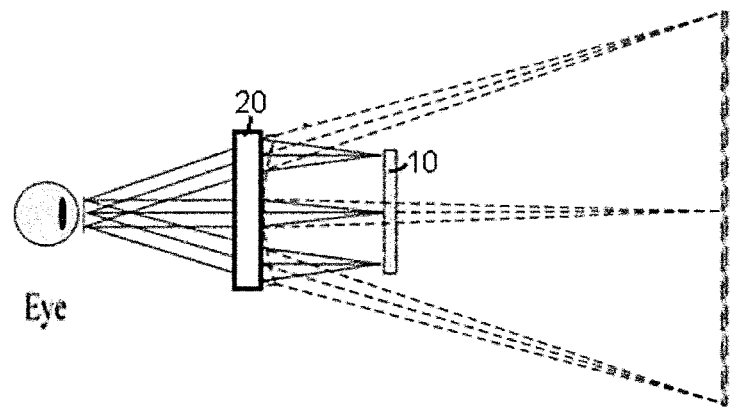
FIG. 3 is a schematic view showing a principle of an optical path of a display device according to an embodiment of the present disclosure.

FIG. 3 is a schematic view showing a principle of an optical path of a display device according to an embodiment of the present disclosure. It is schematic view showing structure and principle of an example of the display device according to embodiments of the present disclosure in the case that the first lens group specifically comprises one first liquid crystal lens 20. As shown in FIG. 3, the display device adopts a transparent display screen 10 as an image source, the first liquid crystal lens 20 can converge light, that is, the first liquid crystal lens 20 can be equivalent to a convex lens. Focal power is provided by the first liquid crystal lens. When a distance between the transparent display screen and the first lens group (namely the first liquid crystal lens in this embodiment) along the main optical axis of the first lens group is less than a focal length of the first lens group, it enables magnification and magnification of the image displayed by the image source such that the human eye can see the image of the transparent display screen magnified several times or even dozens of times, while allowing the real environmental information to reach the human eye through the transparent screen.

In the present embodiment, the first lens group comprises only one lens. It should be understood that, in other embodiments, the first lens group may include a plurality of lenses in order to achieve different magnification effects for the image.

The display device according to the present disclosure is a coaxial optical path system with a transparent display screen serving as an image source (namely a source of the virtual information or the display image), and real environmental information (namely a source of the environmental image) can also reach the human eye through the transparent screen; and the display device provides focal power by using the liquid crystal lens. The present disclosure also includes other hardware and support structure.

Because the display device according to the present disclosure adopts the coaxial optical path system, light from the image displayed in the transparent display screen can reach the human eye at a preset observation position through the first lens group, while light from the real environment can also pass through the transparent screen and the first lens group in sequence to the human eye at the preset observation position, thereby implementing an AR display. In embodiments of the present disclosure, the main optical axis of the first lens group passes through the transparent display screen (in the exemplary embodiment, through the geometric center of the transparent display screen), so that the optical path of the light of the display image (namely the virtual information) is coaxial with the optical path of light from the environmental image (namely the real environmental information). Accordingly, compared with the catadioptric AR optical path in the related art, on the basis of achieving the AR display, the present disclosure can greatly simplify the structure of the optical system, decrease the difficulty to design and manufacture, cut down the cost, greatly reduce volume and dimension of the display device, and improve the process adaptability, which helps the popularization of the AR display device.

In one embodiment, the sizes of both the first lens group and the transparent display screen are specified sizes, and the focal power of the first lens group is the specified focal power.

The display device according to embodiments of the present disclosure may further comprise a second lens group that diffuses light, the second lens group and the first lens group are located on both sides of the transparent display screen, respectively, and the main optical axis of the first lens group coincides with a main optical axis of the second lens group.

In an exemplary embodiment, a focal point, closing to the transparent display screen, of the first lens group and a focal point, away from the transparent display screen, of the second lens group are at the same position.

In some exemplary embodiments, the second lens group comprises one or more lenses, and the one or more lenses comprise a glass lens, a liquid crystal lens or a liquid lens. Moreover, the liquid crystal lens has an adjustable focal power.

Figure 4:
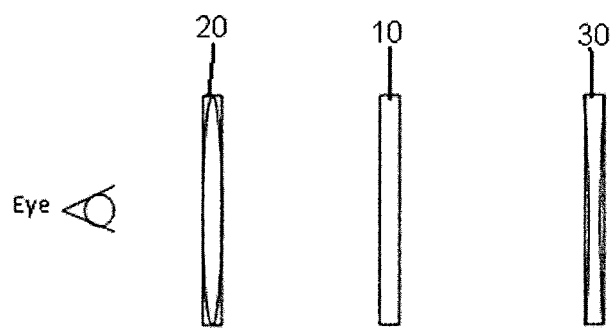
FIG. 4 is a schematic view showing a structure of a display device according to another embodiment of the present disclosure.

The structure of a display device according to another embodiment of the present disclosure is described below by means of an example in which the first lens group specifically comprises one first liquid crystal lens 20 and the second lens group specifically comprises one second liquid crystal lens 30. As shown in FIG. 4, the display device according to another embodiment of the present disclosure comprises: a transparent display screen 10, the first liquid crystal lens 20 and the second liquid crystal lens 30. The first liquid crystal lens 20 is located on one side of the transparent display screen 10, the second liquid crystal lens 30 is located on the other side of the transparent display screen 10, the main optical axis of the first liquid crystal lens 20 coincides with a main optical axis of the second liquid crystal lens 30, and a geometric center of the transparent display screen 10 is on the main optical axis of the first liquid crystal lens 20 and also on the main optical axis of the second liquid crystal lens 30.

In FIG. 4, a distance between the transparent display screen 10 and the first liquid crystal lens 20 is less than a focal length of the first liquid crystal lens 20, such that, light of the image displayed by the transparent display screen 10 is incident on the observation position (namely a position where the human eye is located) through the first liquid crystal lens 20, such that, the angle of view of the image observed at the observation position is increased, and the ambient light is incident on the observation position through the transparent display screen and the first liquid crystal lens 20 or through the first liquid crystal lens 20.

In an embodiment, the first liquid crystal lens 20 and the second liquid crystal lens 30 are located on both sides of the transparent display screen 10, respectively; and the main optical axis of the first liquid crystal lens 20 coincides with a main optical axis of the second liquid crystal lens 30. A focal point, closing to the transparent display screen 10, of the first liquid crystal lens 20 and a focal point, away from the transparent display screen 10, of the second liquid crystal lens 30 are at the same position. In this way, the optical path that the ambient light sequentially passes through the first liquid crystal lens 20 and the second liquid crystal lens 30 to reach the observation position is stable and relatively simple, thereby, it is relatively easy to determine a scaling ratio of a real object in the environment to the observation position. According to the scaling ratio, the distance between the transparent display screen 10 and the first liquid crystal lens 20 can be determined easily. It is relatively easy to realize the matching between the size of the display image (namely the virtual information), of the transparent display screen, projected onto the observation position and the size of the environmental image (namely the real environmental information) projected to the observation position, which is beneficial to further focus the virtual image source and the natural ambient light, so that the virtual image displayed in the display device is more compatible with the real object in the natural environment.

In one embodiment, the first liquid crystal lens 20 can be equivalent to a convex lens, and the second liquid crystal lens 30 is equivalent to a concave lens.

Moreover, the first liquid crystal lens 20 and the second liquid crystal lens 30 are specifically a flat plate structure, are in a light transmitting state, and have a specified thickness. The sizes of the first liquid crystal lens 20 and the transparent display screen 10 are all specified sizes, and the focal power of the first liquid crystal lens 20 is a specified focal power. It should be noted that the abovementioned specified thickness and/or the specified focal power can be set according to actual needs, and is not limited in the present disclosure.

In one embodiment, the transparent display screen can be specifically a transparent flexible display screen, since a flexible image source is more compatible with the field curvature distribution of the lens itself, thereby improving the image quality. And the curvature of the transparent flexible display screen matches the curvature of the first liquid crystal lens 20.

Obviously, compared with those in FIG. 1 and FIG. 2, the display device according to another embodiment of the present disclosure shown in FIG. 4 is obviously more compact in structure. On the basis of implementing the AR display, the display device according to another embodiment of the present disclosure shown in FIG. 4 optimizes these conditional parameters such as the size of the transparent display screen, and the size and the focal power of the first liquid crystal lens 20. A coaxial AR display can also be realized by using only one lens group, without requiring provision of multiple lens groups, which further simplifies the structure of the coaxial display device, and is advantageous for further reducing the size and volume of the coaxial display device, and greatly simplifying the structure of the optical system.

Figure 5:
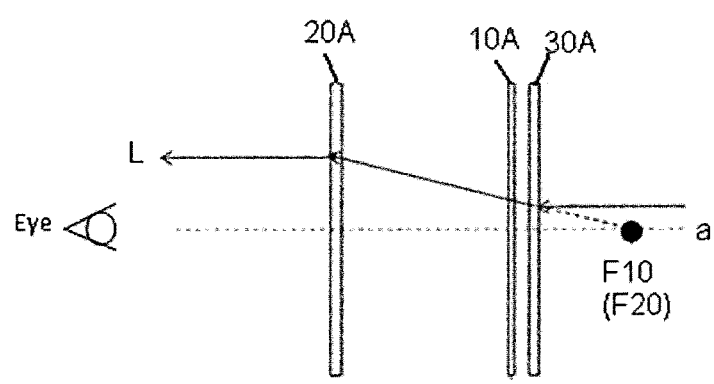
FIG. 5 is a schematic view showing a principle of an optical path of the display device according to another embodiment of the present disclosure.

Moreover, the structure of the display device according to the embodiment shown in FIG. 4 is actually designed to compensate for the influence of the first liquid crystal lens 20 on light from the real environment. The second liquid crystal lens 30, which is equivalent to a concave lens, is added. It may be further understood by referring to FIG. 5. FIG. 5 is a schematic view showing a principle of an optical path of a display device according to another embodiment of the present disclosure. The convex lens 20A of FIG. 5 has the same function as the first liquid crystal lens 20 of FIG. 3 and FIG. 4, and the added concave lens can balance the optical perception of the convex lens to the real world, so that a deformation of the real scene seen is less or can be ignored. The concave lens 30A of FIG. 5 has the same function as the second liquid crystal lens 30 of FIG. 4.

In FIG. 5, the convex lens 20A and the concave lens 30A cooperate with each other. The convex lens 20A and the concave lens 30A are located on both sides of the transparent display screen 10A, respectively; and the main optical axis of the convex lens 20A coincides with a main optical axis of the concave lens 30A.

FIG. 5 shows that, light (shown as an arrowed line L) is incident on the concave lens 30A form the external, and is refracted to the convex lens 20A through the transparent display screen 10A. It can be seen from the reverse extension of the refracted light, a focal point F30, closing to the transparent display screen 10A, of the concave lens 30A and a focal point F20, away from the transparent display screen 10 OA, of the convex lens 20A are at the same position. Here, the horizontal dotted line in FIG. 5 indicates the main optical axis a, and one main optical axis is shown since the main optical axis of the convex lens 20A coincides with the main optical axis of the concave lens 30A. A solid dot located on the right side of the concave lens 30A on the main optical axis indicates a coincidence of the focal point F20 of the convex lens 20A and the focal point F30 of the concave lens 30A. With this arrangement of the focal points, the optical path that the ambient light sequentially passes through the concave lens and the convex lens to reach the human eye is stable and relatively simple, thereby, it is relatively easy to determine a scaling ratio of a real object in the environment to the human eye. According to the scaling ratio, the distance between the transparent display screen and the convex lens can be determined easily. It is relatively easy to realize the matching between the size of the display image (namely the virtual information), of the transparent display screen, projected onto the human eye and the size of the environmental image (namely the real environmental information) projected to the human eye, which is beneficial to further focus the virtual image source and the natural ambient light, so that the display image displayed in the display device is more compatible with the environmental image in the natural environment.

The convex lens 20A in FIG. 5 can be a glass lens, a liquid crystal lens, or a liquid lens. Also, the concave lens 30A can be a glass lens, a liquid crystal lens, or a liquid lens. A variety of types of optional lenses are available, which reduces the construction cost of the display device and improves the adaptability of the display device, thereby, the display device according to the embodiments of the present disclosure is more popular.

Moreover, the lens in the embodiments of the present disclosure employs a liquid crystal lens. This is because it is considered that the liquid crystal lens is usually a flat plate structure, transparent, and thin in thickness; and it does not bring a clear sense of occlusion to the real world when placed in front of the eyes. Furthermore, it is relatively easy to adjust and control the focal length to be smaller, so that the virtual image of the transparent display screen has a larger angle of view to the human eye. In addition, the size of the display device can be limited effectively.

The display device according to embodiments of the present disclosure further comprises supporters configured to support the first lens group, the second lens group and the transparent display screen. These supporters are located at preset positions. It should be noted that the specific components and structures of the above supporters can be set according to actual needs, and are not limited in the present disclosure, but only need to meet the optical requirements between the first lens group, the second lens group and the transparent display screen.

In an exemplary embodiment, the supporter according to embodiments of the present disclosure is a transparent supporter, such that the lens is placed in front of the eye without a clear sense of occlusion to the real world.

In an exemplary embodiment, in FIG. 5, the transparent display screen closing to the concave lens is a transparent flexible display screen. In the embodiments of the present disclosure, a flexible display screen of lens is used as an image source because it is considered that the transparent flexible display screen can be appropriately bent so that curvature of the virtual image on the transparent flexible display screen is more compatible with equivalent curvature of the first lens group, greatly reducing the distortion of the virtual image projected to the observation position, greatly enhancing realism of the virtual image, better blending with the reflected light projected onto the real environment, thereby improving the display effect of the AR.

In fact, in a display device according to another embodiment of the present disclosure, the first lens group may specifically be composed of a plurality of lenses, and the plurality of lenses are collectively equivalent to one convex lens. For example, the lens A, the lens B, and the lens C constitute a first lens group, and are collectively equivalent to one convex lens. An equivalent optical center of the first lens group coincides with the optical center of the first liquid crystal lens 20, and an equivalent focal length of the first lens group coincides with the focal length of the first liquid crystal lens 20.

The second lens group may specifically be composed of a plurality of lenses, and the plurality of lenses are collectively equivalent to one concave lens. For example, the lens D, the lens E, and the lens F constitute the second lens group, and are collectively equivalent to one concave lens. An equivalent optical center of the second lens group coincides with the optical center of the second liquid crystal lens 30, and an equivalent focal length of the second lens group coincides with the focal length of the second liquid crystal lens 30.

The positional relationship between the first lens group, the second lens group and the other components is the same as the positional relationship between the first liquid crystal lens 20, the second liquid crystal lens 30 and other components, and will not be described again.

Based on the same inventive concept, the embodiment of the present disclosure further provides a wearable equipment comprising the display device according to any one of the above embodiments of the present disclosure, and the display device comprises the first lens group and/or the second lens group, and the transparent display screen that are coaxially disposed. On the basis of achieving the AR display, it can greatly simplify the structure of the optical system, decrease the difficulty to design and manufacture, cut down the cost, greatly reduce volume and dimension of the display device disposed in the wearable equipment, and improve the process adaptability, which helps the popularization of the wearable equipment. The wearable equipment of the present disclosure can be worn on a user, increasing the user experience.

In an embodiment, the wearable equipment according to embodiments of the present disclosure is specifically an AR (Augmented Reality) headwear equipment.

The above description refers to embodiments of the present disclosure, it will be appreciated by those skilled in the art that, unless otherwise defined, the singular forms "a", "an", "said" and "the" used herein may also include plural forms. It is to be further understood that the phrase "comprise" used in the description of the present disclosure refers to that there exist the features, integers, steps, operations, elements and/or components, but do not exclude additions of one or more other features, integers, steps, operations, elements, components and/or groups thereof.

It will be appreciated by those skilled in the art that, unless otherwise defined, all terms (including technical and scientific terms) used herein have the same meaning as those commonly understood by those skilled in the art to which the present disclosure belongs. It should also be understood that terms such as those defined in a general dictionary should be understood to have meanings consistent with the meanings in the context of the related art, and unless otherwise defined specifically, will not be explained as idealized or formal meaning.

The above description refers to only some embodiments of the present disclosure, and it should be understood that those skilled in the art can make various changes and modifications to the embodiments of the present disclosure without departing from the principle of the present disclosure, and these changes and modifications should fall within the scope of the present disclosure.

What is claimed is:

1. A display device, comprising: a transparent display screen, and a first lens group configured to converge light, and a second lens group configured to diffuse light, wherein the second lens group and the first lens group are located on both sides of the transparent display screen, respectively; and the main optical axis of the first lens group coincides with a main optical axis of the second lens group;

wherein, the transparent display screen intersects a main optical axis of the first lens group, a distance between the transparent display screen and the first lens group along the main optical axis of the first lens group is less than a focal length of the first lens group, such that, both a display image on the transparent display screen and an environmental image through the transparent display screen and the first lens group or through the first lens group can be observed at an observation position that is located on the main optical axis of the first lens group; wherein both the observation position and the first lens group are located at a same side of the transparent display screen, and the observation position is farther from the transparent display screen than the first lens group;

wherein each of the first lens groups and the second lens group comprises one or more liquid crystal lenses, and the liquid crystal lens has an adjustable focal power; wherein the liquid crystal lens has a flat plate structure.

2. The display device of claim 1, wherein a focal point of the first lens group and a focal point of the second lens group are at a same position.

3. The display device of claim 1, wherein each of the first lens group and the second lens group comprises one or more lenses.

4. The display device of claim 1, wherein the transparent display screen is located is perpendicular to the main optical axis of the first lens group.

5. The display device of claim 4, wherein a geometric center of the transparent display screen is on the main optical axis of the first lens group.

6. The display device of claim 1, wherein the transparent display screen is a flexible transparent display screen.

7. The display device of claim 1, further comprising: a supporter configured to support the first lens group, the second lens group and the transparent display screen.

8. The display device of claim 7, wherein the supporter is a transparent supporter.

9. A wearable equipment, comprising the display device of claim 1.

10. The wearable equipment of claim 9, wherein the wearable equipment is an augmented reality headwear equipment.

11. The wearable equipment of claim 9, wherein in the display device, a focal point, closing to the transparent display screen, of the first lens group and a focal point, away from the transparent display screen, of the second lens group are at a same position.

12. The wearable equipment of claim 9, wherein in the display device, the transparent display screen is located is perpendicular to the main optical axis of the first lens group, a geometric center of the transparent display screen is on the main optical axis of the first lens group, and the transparent display screen is a flexible transparent display screen.

* * * * *